Jan. 17, 1939.  V. W. KLIESRATH  2,143,918
HYDRAULIC POWER UNIT
Original Filed May 15, 1933
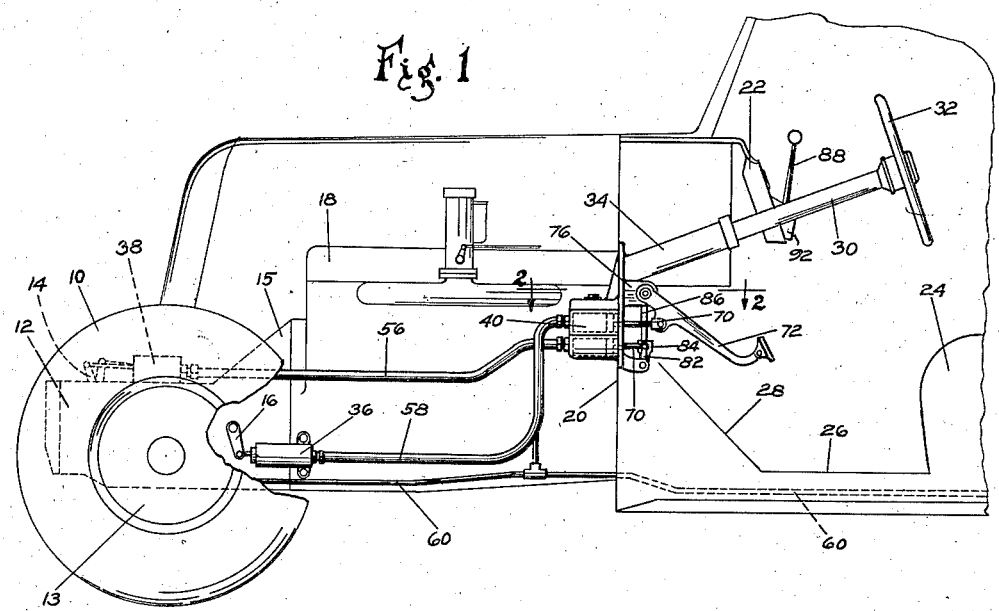
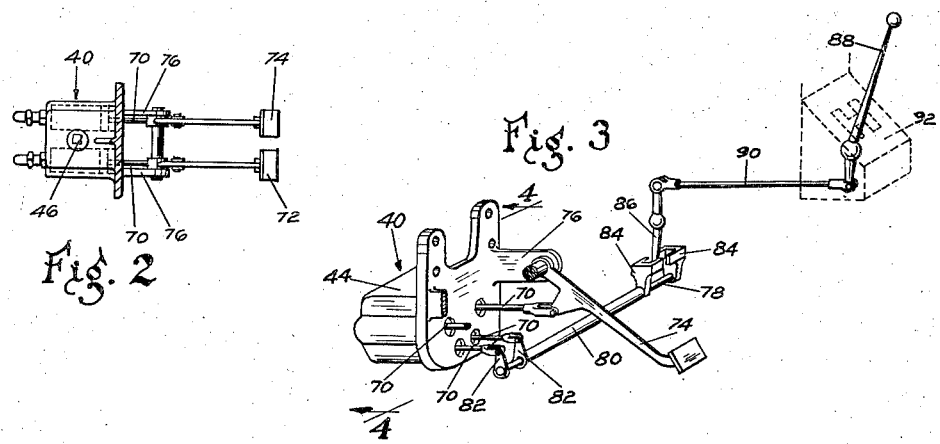
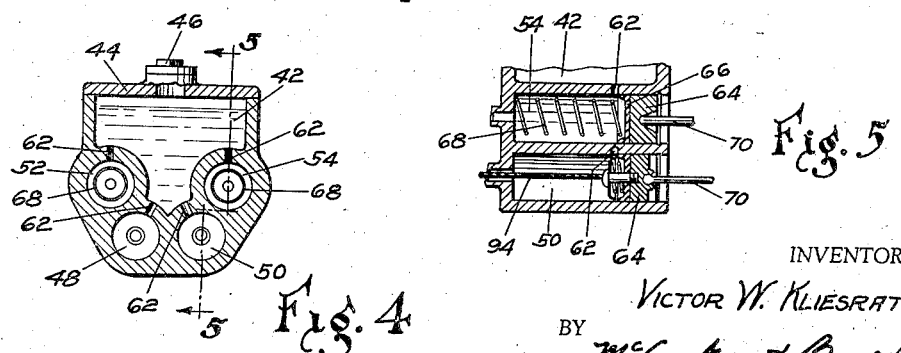
INVENTOR.
VICTOR W. KLIESRATH
BY McConkey & Booth
ATTORNEY.

Patented Jan. 17, 1939

2,143,918

UNITED STATES PATENT OFFICE 2,143,918

HYDRAULIC POWER UNIT

Victor W. Kliesrath, South Bend, Ind., assignor to The Steel Wheel Corporation, Chicago, Ill., a corporation of New York Original application May 15, 1933, Serial No. 671,049. Divided and this application March 4, 1935, Serial No. 9,224

1 Claim. (Cl. 74—473)

This invention relates to hydraulic power units and more particularly to hydraulic units for operating the controls of automotive vehicles.

One of the objects of the invention is to provide a hydraulic power unit whose operation is unaffected by expansion or contraction of the fluid employed due to temperature changes.

Another object is to provide a simple, compact unit for positively operating a plurality of controls selectively.

In one desirable arrangement the invention is embodied in the novel control system described and claimed in my copending application, Serial No. 671,049, filed May 15, 1933, of which this application is a division. In this system the hydraulic unit forming the subject matter of the present application includes a reservoir which separately communicates with a plurality of power cylinders, there being pistons operating in the cylinders and cutting off communication between the reservoir and cylinders respectively in one position while permitting such communication in another position.

The invention also provides novel operating means for the pistons, particularly designed for use in connection with gear shift means. In one arrangement such operating means includes coaxial rockshafts connected to the pistons and operated through slotted operating arms selectively engaged by a shift lever.

According to another feature of the invention the operating piston is connected to a piston to be operated by a flexible tension element to provide positive movement of the operated piston in both directions.

Other objects, advantages and novel features will appear from the following detailed description when taken in connection with the accompanying drawing showing one embodiment of the invention. The drawing, however, is for the purpose of illustration only and is not to be taken as a definition of the scope of the invention, reference being had for this purpose to the appended claim.

In the drawing wherein like numerals designate like parts throughout the several views:

Figure 1 is a diagrammatic longitudinal section with parts in elevation through the front part of an automobile including a control system embodying the invention;

Figure 2 is a partial section on the line 2—2 of Figure 1;

Figure 3 is a perspective view of the novel hydraulic unit and operating means;

Figure 4 is a section substantially in the plane 4—4 of Figure 3; and

Figure 5 is a section on the line 5—5 of Figure 4.

The automobile in connection with which the invention is illustrated is of the general type fully described in my copending application Serial No. 651,821, filed January 14, 1933, and includes front road wheels 10 which may be provided with hydraulically operated brakes 13 and which may also be driven through a suitable differential (not shown) and a transmission 12, the speed ratio of which is selectively settable by levers 14. The transmission is centrally connected to a suitable engine 18 through a clutch arranged in a housing 15 and operated by a clutch lever 16.

The engine 18 is preferably mounted as described in the above-referred to application No. 651,821, just forwardly of a transversely extending dash 20 which carries an instrument board 22 arranged just in front of a driver's seat 24. The dash 20 is carried by a base 26 which also carries an inclined foot board 28. A steering column 30 carrying a suitable wheel 32 is mounted in a bracket 34 secured to the dash and is connected to the wheels 10 in any desired manner to steer the vehicle.

The vehicle controls are operated by suitable hydraulic operating cylinders, a cylinder 36 being secured to the engine and having a piston connected to operate the clutch lever 16 and cylinders 38 being mounted on the transmission and having pistons connected to operate levers 14. The brakes are also provided with operating cylinders (not shown).

In order to actuate the controls, a novel master cylinder is provided shown as constituted by a casting 40 which is formed with a flange secured to the front of the dash by bolts or the like which extend through the dash and engage the bracket 34. The casting 40 includes a reservoir 42 for a suitable hydraulic fluid such as the usual mixture of alcohol and castor oil, the reservoir being closed by a tight fitting cover 44 provided with a removable filter cap 46.

The casting 40 also provides directly below the reservoir a pair of cylinders 48 and 50 and slightly above and to the outsides of these cylinders a second pair of cylinders 52 and 54. The cylinders 48 and 50 are connected to cylinders 38 respectively to control the transmission through lines 56, cylinder 52 is connected to clutch operating cylinder 36 through line 58 and cylinder 54 is connected to the brake operating cylinders by lines 60. Each of the cylinders is connected to the reservoir 42 by an open port 62, the ports preferably being located adjacent the rear ends of the cylinders.

Each of the cylinders is provided with a piston 64 shown faced by a suitable sealing washer 66 which may be held in place by a spring 68. Each of the pistons has a piston rod 70 which extends through the dash to be operated from within the driver's compartment.

The pistons in the clutch and brake cylinders 52 and 54 have their piston rods pivoted to and operated by suitable clutch and brake pedals 72 and 74 respectively which may be pivoted to brackets 76 formed with or secured to the casting 40 and extending through the dash. These pedals as shown are of the same type disclosed in my copending application, Serial No. 671,049, filed May 15, 1933, of which this application is a division. If desired the brackets 76 may be secured to bracket 34 or to the dash rather than to casting 40.

Novel means are provided to actuate the pistons in cylinders 48 and 50 to operate the transmission control levers 14, such means as shown being constituted by concentric shafts 78 and 80, each of which carries a lever 82 pivoted to the piston rods 70 respectively corresponding to these cylinders. At their opposite ends shafts 78 and 80 have slotted levers 84, the slots being opposite each other in one position of the levers as best shown in Figure 3.

The shafts are rocked by a lever 86 mounted in its central portion on a universal pivot and adapted to selectively engage one of the slotted levers 84 to rock the corresponding shaft. Lever 86 is operated by a hand lever 88 likewise mounted on a universal pivot and connected to lever 86 by a pivoted link 90. If desired a suitable guide 92 having an H slot therein may be provided for the hand lever 88, both of these parts preferably being mounted on the instrument panel 22.

In order to insure positive operation of the transmission control levers in both directions the pistons in cylinders 38 are preferably connected to the pistons in cylinders 48 and 50 by flexible tension members 94 which are secured to the respective pistons and pass through the lines 56. By this arrangement movement of the pistons in cylinders 48 and 50 positively moves the pistons in cylinders 38 through the liquid columns in lines 56 in one direction and through tension members 94 in the other direction.

In operation as the pistons are moved to the left from the position of Figures 1 and 5, they cut off ports 62 and thereafter move the fluid through the lines to operate the pistons in the corresponding operating cylinders. The return movement of the clutch and brake pistons is preferably effected through suitable springs, not shown, and that of the transmission pistons by movement of the control lever 88 in the opposite direction. As soon as the ports 62 are uncovered the lines are in open communication with the reservoir so that any deficiency of fluid therein can be supplied by the reservoir or any pressure therein can be relieved into the reservoir.

Operation of hand lever 88 from side to side causes lever 86 to move into the slot in one or the other of levers 84 and forward or backward rocking thereafter rocks the selected shaft 78 or 80 in either direction as desired. This causes inward or outward movement of the piston in cylinder 48 or 50 corresponding to the selected shaft and moves the corresponding lever 14 in the desired direction to effect the desired setting of the transmission.

By the arrangement described any expansion or contraction of the hydraulic fluid in the lines is relieved through the open ports 62 to the reservoir and it is assured that the lines are always full of fluid and that the fluid is not under pressure or vacuum due to temperature changes. Thus a positive and accurate control can be maintained at all times regardless of fluctuations in temperature. In the case of the transmission controls a positive control is obtained in both directions through the use of the tension member and the lines are always full of fluid.

The fluid lines are preferably flexible so that they may be bent into any convenient configuration which feature is particularly important in the case of a front mounted transmission as shown to lead the control pipes around the engine. This feature is also highly advantageous for use in connection with movably mounted engines.

While only one embodiment of the invention has been shown and described it will be obvious that many changes might be made therein and it is not intended that the scope of the invention shall be limited thereto or otherwise than by the terms of the appended claim.

What is claimed is:

Remote control operating means comprising a lever mounted to oscillate intermediate its ends in right-angular intersecting planes, a second lever spaced from said first lever and oscillatably mounted intermediate its ends, a link connecting the lower end of the first lever with the upper end of the second lever, a pair of rockable operating shafts, one telescoped within the other, and an operating arm formed on each of said shafts, said arms having opposed slots formed therein and aligned in one position of the shafts, said slotted arms being positioned adjacent the lower end of said second lever for selective engagement thereby and movement therewith in response to successive movements of said first lever in said planes.

VICTOR W. KLIESRATH.